(12) United States Patent
Sacripante et al.

(10) Patent No.: US 6,795,228 B2
(45) Date of Patent: Sep. 21, 2004

(54) DISPLAY MATERIAL FOR ELECTRIC PAPER AND APPLICATIONS THEREOF

(75) Inventors: Guenno G. Sacripante, Oakville (CA); H. Bruce Goodbrand, Hamilton (CA); Beng S. Ong, Mississauga (CA); Robert A. Sprague, Saratoga, CA (US)

(73) Assignee: Xerox Corporation, Stamford, CT (US)

(*) Notice: Subject to any disclaimer, the term of this patent is extended or adjusted under 35 U.S.C. 154(b) by 204 days.

(21) Appl. No.: 10/195,641

(22) Filed: Jul. 12, 2002

(65) Prior Publication Data

US 2003/0112490 A1 Jun. 19, 2003

Related U.S. Application Data

(60) Provisional application No. 60/339,789, filed on Dec. 17, 2001.

(51) Int. Cl.[7] ............................ G02B 26/00; G09G 3/34
(52) U.S. Cl. ...................................... 359/296; 345/107
(58) Field of Search ............................ 345/55, 84, 107; 359/296

(56) References Cited

U.S. PATENT DOCUMENTS

| | | | |
|---|---|---|---|
| 4,143,103 A | 3/1979 | Sheridon | 264/4 |
| 5,825,529 A | 10/1998 | Crowley | 359/296 |
| 5,894,367 A | 4/1999 | Sheridon | 359/623 |
| 6,110,538 A | 8/2000 | Sheridon | 427/457 |
| 6,222,513 B1 | 4/2001 | Howard et al. | 345/84 |
| 6,235,395 B1 * | 5/2001 | Sacripante et al. | 428/403 |
| 6,262,707 B1 | 7/2001 | Sheridon | 345/111 |

* cited by examiner

Primary Examiner—David N. Spector
(74) Attorney, Agent, or Firm—Linda M. Robb

(57) ABSTRACT

A display material for use in an electric paper system includes two opposing outer surfaces, between which is disposed a plurality of optically and electrically anisotropic elements suspended in a substance capable of being liquified. A rotatable disposition of each element is achievable while the element is suspended in the substance and the substance is liquified.

22 Claims, 7 Drawing Sheets

_US 6,795,228 B2_

DISPLAY MATERIAL FOR ELECTRIC PAPER AND APPLICATIONS THEREOF

INCORPORATIONS BY REFERENCE

This application is based on a Provisional Patent Application No. 60/339,789 filed Dec. 17, 2001.

The following patents are hereby incorporated by reference into this application: U.S. Pat. No. 4,143,103 by Sheridon titled "Method of Making a Twisting Ball Panel Display"; U.S. Pat. No. 5,825,529 by Crowley titled "Gyricon Display with No Elastomer Substrate"; U.S. Pat. No. 5,894,367 by Sheridon titled "Twisting Cylinder Display Using Multiple Chromatic Values"; U.S. Pat. No. 6,110,538 by Sheridon titled "Method of Making a Gyricon Display Using magnetic Latching"; U.S. Pat. No. 6,222,513 by Howard et al. titled "Charge Retention Islands for Electric Paper and Applications Thereof"; and U.S. Pat. No. 6,262,707 by Sheridon titled "Gyricon Displays Utilizing Magnetic Addressing and Latching Mechanism".

BACKGROUND OF THE INVENTION

This invention relates generally to field activated display sheets and more particularly concerns a field activated display sheet which utilizes both an electric field and a thermal field to activate twisting-ball displays, such as gyricon displays and the like.

Typically, a display device, in sheet form, comprises a thin sheet, which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to making a field induced display sheet such as U.S. Pat. No. 4,143,103 titled "Method of Making a Twisting Ball Panel Display", in which the display sheet utilizes an elastomer substrate containing an array of addressable elements sandwiched between two electrode layers. The conductors of the first electrode layer are oriented orthogonally relative to the conductors of the second electrode layer. An addressable element is rotated upon application of an electric field between opposing conductors.

An alternate approach was disclosed in U.S. Pat. No. 5,717,515 titled "Canted Electric Fields for Addressing a Twisting Ball Display", having an array of addressable elements, with each array element including at least one spheroidal rotational element. A preferred direction of orientation is selected for rotational elements of a selected array element, with the direction of orientation forming an angle with a vector normal to a planar portion of the substrate surface in the vicinity of the selected array element. Rotational elements of the selected array element are aligned with the preferred direction of orientation by applying an electric field in the vicinity of the selected array element. The electric field has an electric field vector oriented parallel to the selected preferred direction, thereby causing rotational elements of the selected array element to rotate so as to align with the preferred direction of orientation.

Multithreshold addressing was disclosed by U.S. Pat. No. 5,739,801 titled "Multithreshold Addressing of a Twisting Ball Display", in which electrically and optically anisotropic spheroidal rotational elements have at least two different rotation thresholds. The spheroidal rotational elements are disposed in an elastomer substrate together with an addressing electrode assembly. The addressing electrode assembly allows a preferred region of the substrate to be selected in which at least one rotational element of the first set and at least one rotational element of the second set are disposed. A first and second electric field are applied to the selected region, with each of the first and second electric fields extending throughout the region. The first field caused rotation of rotational elements of both the first and second sets of rotational elements in the region. The second electric field facilitates rotation of rotational elements of the second set, without causing further rotation of any rotational element of the first set.

Although these approaches, utilizing a standard vertical electric field, are useful, it is desirable to improve on their performance. Accordingly, it is an object of this invention to provide a means for more effectively moving material within electric paper pixels than is possible with a standard vertical electric field, while improving bistability. Bistability is defined herein as maintenance of an image formed by an electric field for a suitable period of time after removal of the electric field.

SUMMARY OF THE INVENTION

Briefly stated, and in accordance with one aspect of the present invention, there is disclosed a display material for use in an electric paper system. The material includes two opposing outer surfaces, between which is disposed a plurality of optically and electrically anisotropic elements suspended in a substance capable of being liquified. A rotatable disposition of each element is achievable while the element is suspended in the substance and the substance is liquified.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1A:
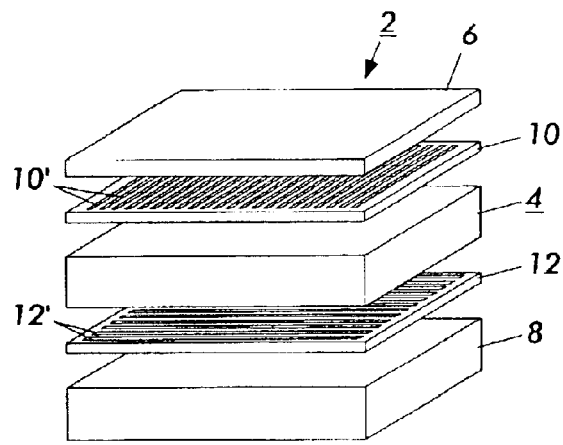
FIGS. 1A–1C illustrate a technique for fabricating display sheets in the prior art.
Figure 1B:
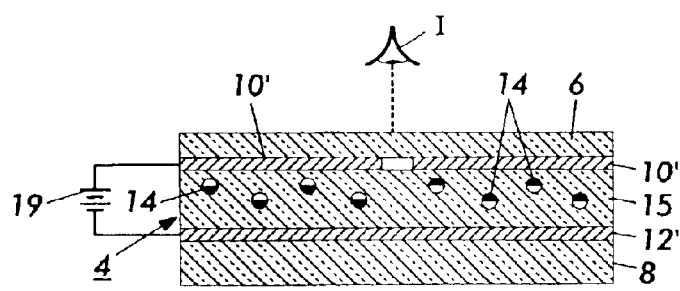

Referring to FIG. 1a, which shows an example of a prior art device disclosed in U.S. Pat. No. 4,143,103, cited above. Character 2 designates a display which has a display panel 4 sandwiched between substrates 6 and 8. Intermediate the display panel 4 and substrate 6 is a first grid 10 of parallel electrical conductors 10'. A second grid 12, having parallel electrical conductors 12' oriented orthogonally relative to the conductors 10' of the first grid 10, is provided between the substrate 8 and the display panel 4. At least one of the substrates 6 and 8 and at least the conductors of the grid adjacent that substrate are optically transparent so that ambient light can impinge upon the display panel 4 and so that the display provided by panel 4 can be viewed. As shown in FIG. 1b, substrate 6 and conductors 10' are of optically transparent materials so that the ambient light incident upon the display will provide a visible image at I.

The display panel 4 includes a distribution of minute particles 14 which are optically anisotropic. The particles 14 are surrounded by a transparent dielectric fluid which, due to the optical anisotropy of the particles 14 and the difference in Zeta potential due to the coatings used to achieve that optical anisotropy, causes the particles 14 to have an electrical anisotropy. In addition to the particles 14 and the dielectric liquid which surrounds those particles, the panel 4 includes a solid, optically transparent support material 15 which permits the particles 14 to have the desired rotational freedom without having translational freedom.

Figure 1C:
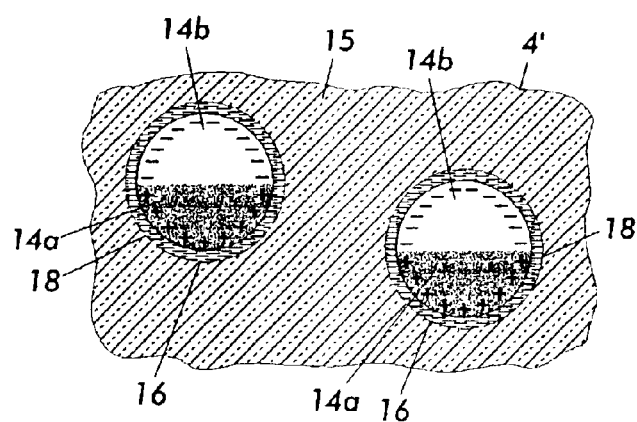

Due to the difference in Zeta potential between the hemispheres 14a and 14b and the immersion of each of the spheres 14 in the dielectric liquid 18, the spheres 14 acquire an electrical charge, as shown symbolically in FIG. 1c, where hemispheres 14a are more positive than hemispheres 14b. When a power source 19 is coupled across one of the electrodes 10' of the grid 10 and one of the electrodes 12' of the grid 12, as shown in FIG. 1b, the positively charged hemisphere 14a will be attracted to the more negative electrode 12' and the spheres 14 within the field developed by the energized electrodes 10' and 12' will rotate, but without substantial translation, such that the light reflecting hemispheres 14b are oriented toward I. Thus, a light spot on a dark background is provided. By reversing the polarity of source 19, a black spot on a light background can be provided. By sequentially coupling the source 19 to selected of the crossover points of electrodes 10' and 12', as is done in conventional matrix addressing, an image is provided and viewable at I.

However, for the prior art device of FIG. 1 to be used as a flexible and re-imageable document, it must have bistability. When the image is formed with an electric field, the field must be maintained or the image deteriorates when the field is removed. For the prior art example, the image deteriorates slowly when the electric field is removed. To extend this device to become a re-imageable paper-like device, a method for freezing or fixing the image is necessary.

Figure 2:
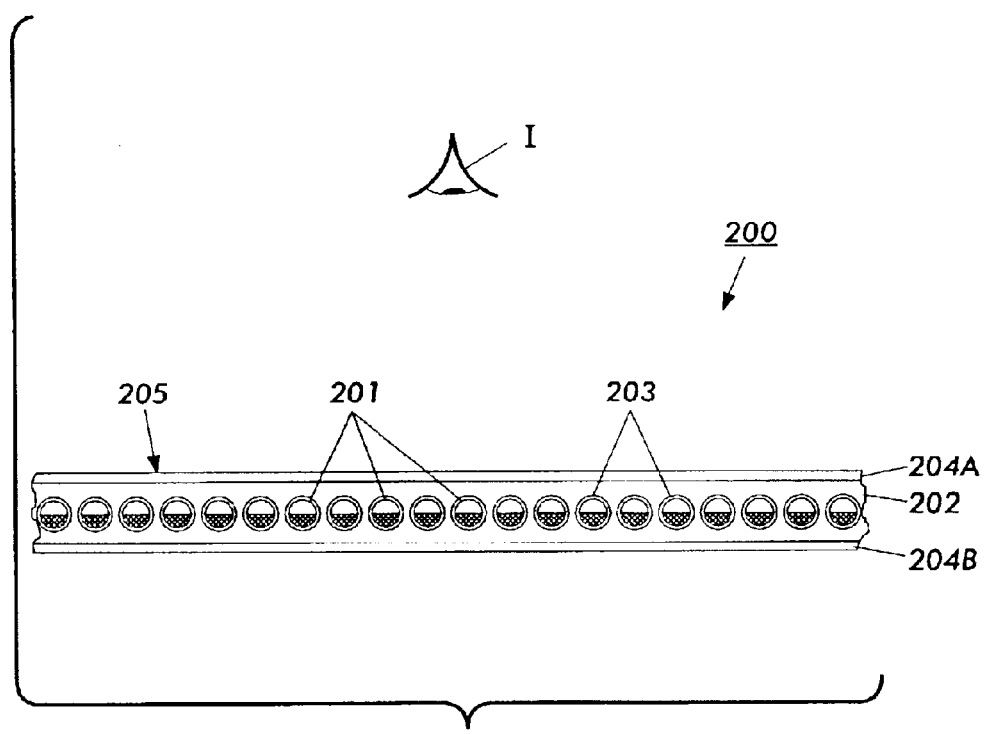
FIG. 2 illustrates a side view of a gyricon display in an embodiment wherein the gyricon rotational elements are arrayed in a close-packed monolayer.

FIG. 2 provides a more detailed side view of a gyricon display 200 in a specific embodiment. In display 200, gyricon rotational elements 201 are placed in a monolayer in elastomer substrate 202. Substrate 202 is permeated by a dielectric fluid, for example Isopar®, to which has been added about 0.5 to about 2 weight percent of a gelating agent, for example Trans-4-t-butyl-1-phenyl-cyclohexanol, or any other suitable gelating agent. Substrate 202 is swelled by the dielectric fluid, thus creating cavities 203 in which the gyricon rotational elements may rotate. Gyricon rotational elements are electrically dipolar in the presence of the dielectric fluid and so are subject to rotation upon application of an electric field.

Figure 3:
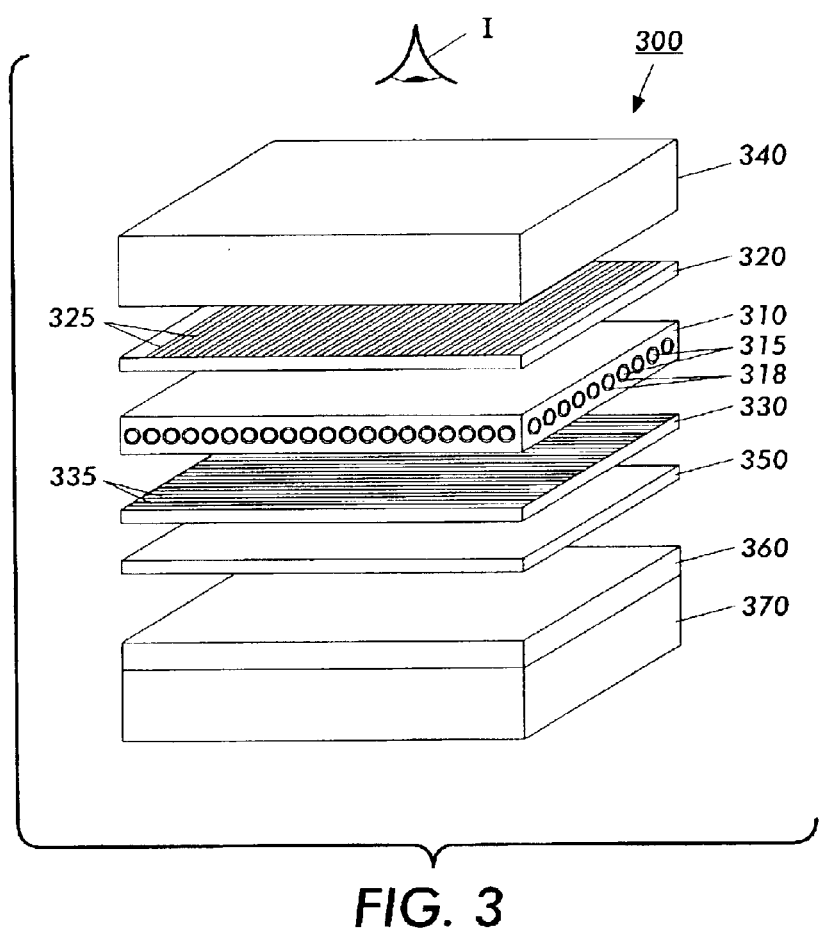
FIG. 3 shows an exploded view of one embodiment of the gyricon display sheet, wherein the monolayer of FIG. 2 is shown with an examplary addressing scheme.

FIG. 3 illustrates an exploded view of one embodiment of the display sheet, with one embodiment of an addressing method. In this embodiment, gyricon display sheet 300 has elastomer layer 310 with a single layer of gyricon rotational elements 315. Elastomer layer 310 is permeated by a dielectric fluid, for example Isopar®, to which has been added about 0.5 to about 2 weight percent of a gelating agent, for example Trans-4-t-butyl-1-phenyl-cyclohexanol, or any other suitable gelating agent. Each gyricon rotational element 215 resides in its own liquid-filled cavity 318 within layer 310. Above layer 310 is electrode sheet 320 having parallel conductor strips 325, which can generate electric fields in or parallel to the plane of layer 310. Disposed on the opposite side of layer 310 is layer 320 having parallel heater strips 335 oriented orthogonally to the conductor strips 325 of layer 320. Parallel heater strips 335 may comprise resistance heaters or any other known heater means. An optional low-resistance ground plane electrode 360 may be disposed on the opposite side of heater layer 330 from sheet 310. Thin dielectric separator layer 350 separates heater layer 330 from ground plane 360. Layer 350 can be, for example, a deposited polymer or a plastic sheet. Surrounding the electrode configuration are two substrate layers 340 and 370. At least one face of gyricon sheet 300 is optically transparent. For example, if an observer at I is to view gyricon sheet 300, then substrate layer 340 and electrode layer 320 preferably should all be transparent.

It should be noted that in all the drawings of this specification for the purpose of clarity where there is a plurality of each element, only a few are numbered. However, it should be understood that all the elements that have the same shape as the numbered elements are the same as the numbered elements.

Figure 4:
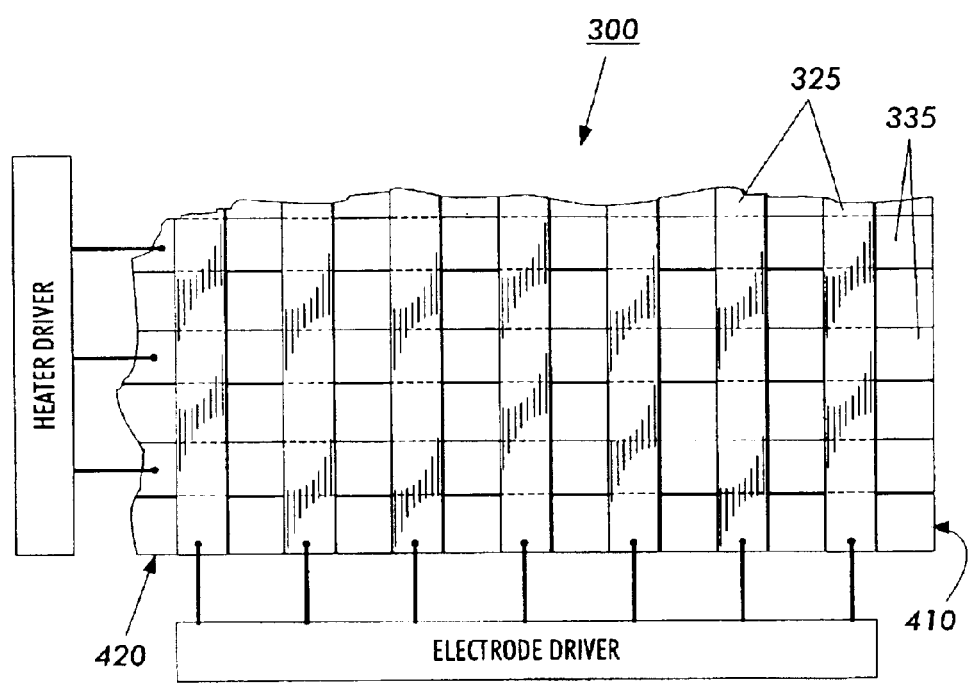
FIG. 4 is a top view of the gyricon display sheet of FIG. 3.
Figure 5:
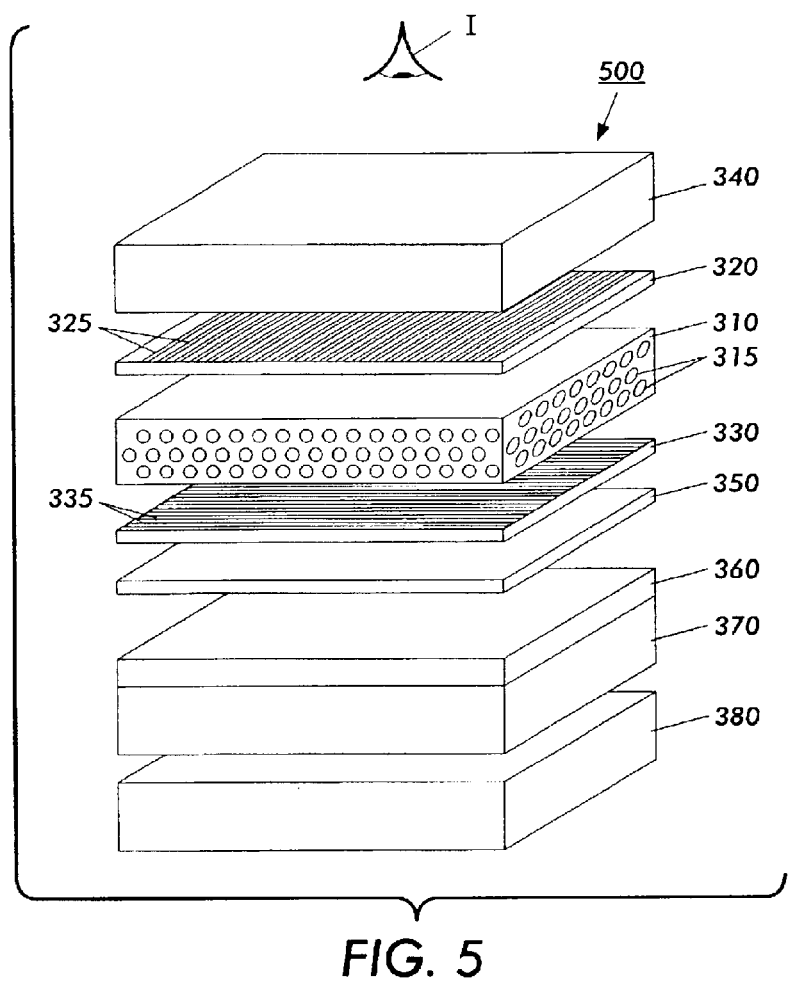
FIG. 5 shows an exploded view of another embodiment of the gyricon display sheet, wherein the gyricon rotational elements are arrayed in multiple layers.

Referring to FIG. 4, there is shown a top view of sheet 300, wherein parts corresponding to like parts of FIG. 3 have the same reference numerals. Conductive strips 325 are placed on layer 420 to form lines parallel to the edge 310 of layer 420. Also, heater elements 335 are placed on layer 330, not shown, to form parallel lines along the length 420 of layer 330. When a given electrode strip 325 and a given heater strip 335 are activated, an electric field is created between the activated electrode and the ground plane, thereby causing the gyricons to rotate, but only where a pulse of power is applied to the activated heater strip. At this crossing point, the fluid in the cavities surrounding the affected gyricons is heated to a desired temperature, for example, about 80° C. At this temperature, the dielectric fluid containing the gelating agent becomes a low viscosity liquid, thus allowing the affected gyricons to rotate. Since only one column of gyricons is activated by the electric field and simultaneously heated, only the gyricon rotational elements in that column are rotated. When the thermal field is removed, the liquid in the cavities surrounding the affected gyricons cools to below the gel point of the liquid in the cavities, thereby fixing the image by the gelation of the liquid phase. This procedure is repeated to develop an image on sheet 300 as seen by an observer at I. To minimize the effects of thermal diffusion, the dimensions of the paper thickness, heater strip widths, and the addition of an optional backside heat sink, shown in FIG. 5, are selected so that there is only local heating to enable one column to switch at a time. The display sheet 300 is capable of activating or deactivating the gyricons by a passive matrix addressing using a plurality of voltage sources and a plurality of heater drivers contacting the display sheet 300 at the sides of the sheet.

Referring now to FIG. 5, there is shown an exploded view of an alternate embodiment of an addressing method for the gyricon display sheet, wherein parts corresponding to like parts of FIG. 3 have the same reference numerals. A gyricon display sheet 500 has elastomer layer 310 with multiple layers of gyricon rotational elements 315. Elastomer layer 310 is permeated by a dielectric fluid, for example Isopar, to which has been added about 0.5 to about 2 weight percent of a gelating agent, for example Trans-4-t-butyl-1-phenyl-cyclohexanol. Each gyricon rotational element 315 resides in its own liquid-filled cavity 318 within layer 310. Above layer 310 is electrode sheet 320 having parallel conductor strips 325, which can generate electric fields in or parallel to the plane of layer 310. Disposed on the opposite side of layer 310 is layer 330 having parallel heater strips 335 oriented orthogonally to the conductor strips 325 of layer 320. An optional low-resistance ground plane electrode 360 may be disposed on the opposite side of heater layer 330 from layer 310. Thin dielectric separator layer 350 separates heater layer 330 from ground plane 360. Layer 350 can be, for example, a deposited polymer or a plastic sheet. Surrounding the electrode configuration are two substrate layers 340 and 370. Heat sink 380 is disposed on the opposite side of substrate layer 370 from layer 310. At least one face of gyricon sheet 500 is optically transparent. For example, if an observer at I is to view gyricon sheet 500, then substrate layer 340 and electrode layer 320 preferably should all be transparent.

Referring once more to FIG. 4, there is shown a top view of sheet 300, wherein parts corresponding to like parts of FIG. 3 have the same reference numerals. Conductive strips 325 are placed on layer 420 to form lines parallel to the edge 310 of layer 420. Also, heater elements 335 are placed on layer 330 to form parallel lines along the length 320 of layer 330. When a given electrode strip 325 and a given heater strip 335 are activated, an electric field is created between the activated electrode and the ground plane, thereby causing the gyricons to rotate, but only where a pulse of power is applied to the activated heater strip. At this crossing point, the fluid in the cavities surrounding the affected gyricons is heated to a desirable temperature, for example, about 80° C. At this temperature, the dielectric fluid containing the gelating agent becomes a low viscosity liquid, thus allowing the affected gyricons to rotate. Since only one column of gyricons is activated by the electric field and simultaneously heated, only the gyricon rotational elements in that column are rotated. When the thermal field is removed, the liquid in the cavities surrounding the affected gyricons cools to below the gel point of the liquid in the cavities, thereby fixing the image by the gelation of the liquid phase. This procedure is repeated to develop an image on sheet 300 as seen by an observer at I. To minimize the effects of thermal diffusion, the dimensions of the paper thickness, heater strip widths, and the addition of an optional backside heat sink, shown in FIG. 5, are selected so that there is only local heating to enable one column to switch at a time.

Figure 6:
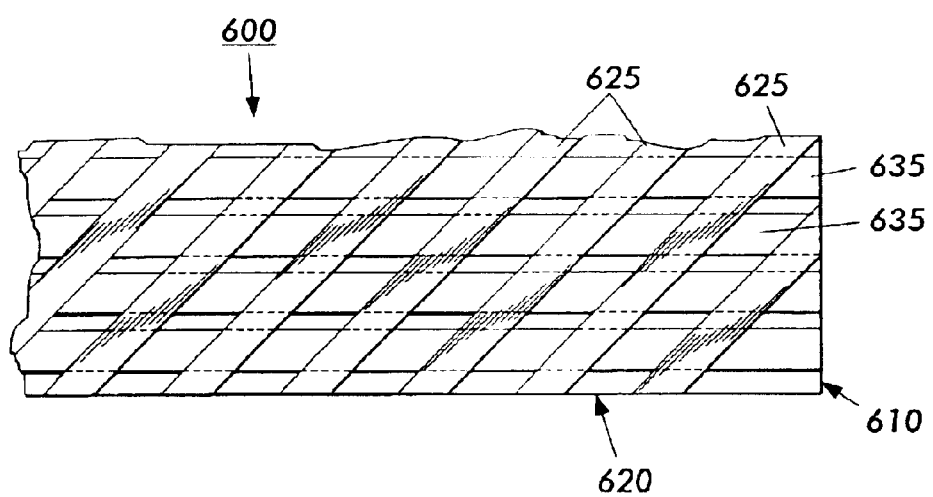
FIG. 6 is a portion of the top view of another embodiment of the addressing scheme shown in FIG. 3.

Referring now to FIG. 6, there is shown another embodiment of an addressing method for the gyricon display sheet. In this embodiment electrically conductive strips 625 are arranged in such a manner that they form parallel lines which are diagonal with respect to the heater strips 635. Again, when a given conductive strip 625 and a given heater strip 635 are activated, a field is created at the crossing point which causes the corresponding gyricons to rotate as above and become fixed in the rotated position upon removal of the electric and thermal fields.

As will be apparent to one of skill in the art, in any of the above-described embodiments the location of electrode layer 320 and heater layer 330 could be reversed. For example, referring again to FIG. 3, layers 320 and 3230 could be interchanged such that layer 330 is located above layer 310 and layer 320 is disposed on the opposite side of layer 310. As above, when a given conductive strip 325 and a given heater strip 335 are activated, a field is created at the crossing point which causes the corresponding gyricons to rotate as above and become fixed in the rotated position upon removal of the electric and thermal fields.

Although the embodiments discussed hereinabove include layers of electrode and heater strips, various alternate addressing methods are also contemplated. For example, the electrodes may form charge-retaining islands, as taught by Howard et al. in U.S. Pat. No. 6,222,513 and incorporated by reference in its entirety, and the heaters form heat-retaining islands or be in the form of a single continuous layer. Various mechanical arrangements are envisioned for external charge transfer to the gyricon display sheet. One such arrangement is a single element stylus, which could be utilized like a pen or pencil. A soft, conductive tip is used to make contact with the electrode layer. The tip is connected by a conductive core to a power supply. The conductive core is surrounded by insulating material that allows a user to handle the stylus without threat of electric shock. A single element stylus is also possible. In this embodiment, the heaters form a single continuous layer, which is heated while the stylus moves across the sheet, thus allowing the rotational elements to rotate. When the stylus is lifted, heat is no longer applied by the heater layer, thus locking the rotated elements into position.

Alternatively, a one-dimensional array of charge transfer elements could also be built and used like a print head or wand. The contact charging wand may be comprised of alternating conductive charge transfer elements and insulating elements, as described in U.S. Pat. No. 6,222,513. The charge transfer elements must make reliable contact to the electrode layer while moving with respect to the gyricon display sheet during image generation. In this embodiment the heaters may form strips disposed in the same direction as the print head or wand.

A two-dimensional array of addressing elements is also envisioned that addresses entire gyricon display sheets. In such a device, a charge transfer platen, a gyricon display sheet is temporarily positioned inside the device, which includes a supporting base and a two-dimensional matrix addressing array of addressing elements. The matrix addressing array can be positioned in contact with or in proximity to the gyricon display sheet. The matrix array may be rotated about a hinge through an arc into position above the gyricon display sheet. Charge is transferred to the electrode contact points of the gyricon display sheet simultaneously, an image is created, and the gyricon display sheet can be removed. In this embodiment, the heaters are in the form of a continuous sheet, which is heated when the matrix array contacts the display sheet. Hybrid plate-wand configurations are also conceivable, which might provide a compromise between cost and performance provided by the two approaches.

It should be noted that although the above embodiments of this invention have been described as utilizing spherical gyricons, cylindrical elements such as those described in U.S. Pat. No. 5,894,367 titled "Twisting Cylinder Display Using Multiple Chromatic Values", cited above, could be used instead of the spherical gyricons. Additionally, the display elements, whether they are spherical or cylindrical, may be utilized in black and white, highlight, or color display sheets according to this invention.

As described above, the gyricon display sheet is made with swelled elastomer, with each gyricon rotational element situated in a cavity. However, the display sheet may also be constructed without elastomer and without cavities. In such a display sheet, the gyricon rotational elements are placed directly in a dielectric fluid, for example Isopar®, to which has been added about 0.5 to about 2 weight percent of a gelating agent, for example Trans-4-t-butyl-1-phenyl-cyclohexanol, or any other suitable gelating agent. The rotational elements and the dielectric fluid with gelating agent are then sandwiched between two retaining members (e.g., between addressing electrodes and heaters). There is no elastomer substrate.

Figure 7:
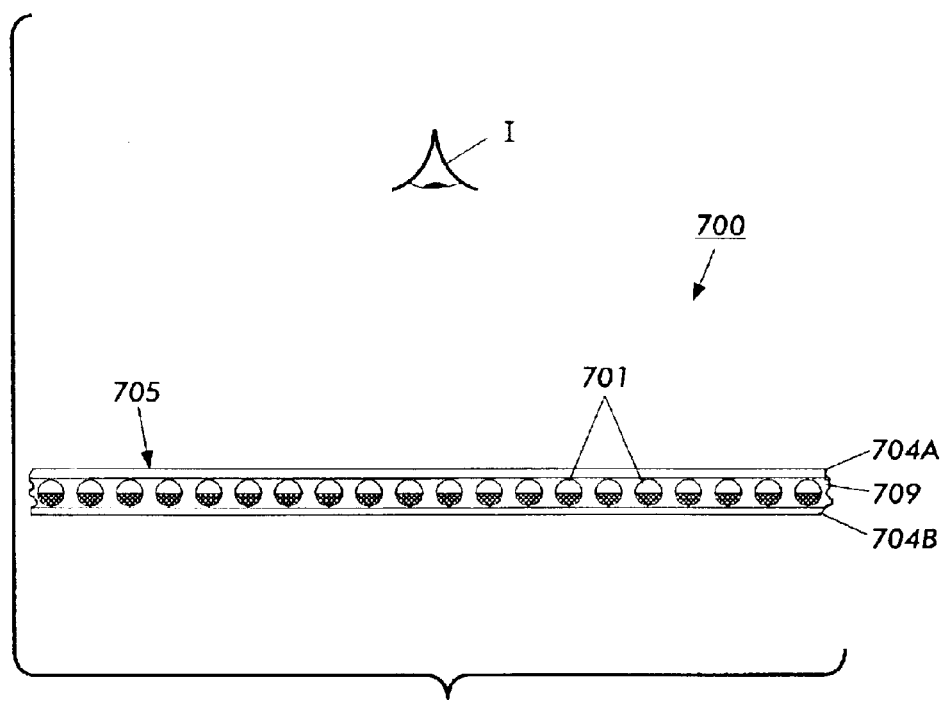
FIG. 7 illustrates an alternative embodiment of the gyricon display sheet in which a xlose-packed monolayer of gyricon rotational elements is placed in a fluid directly between transparent layers, without an elastomer substrate medium.

FIG. 7 illustrates a side view of a no-cavities gyricon display sheet. In sheet 700, a monolayer of gyricon rotational elements 701 of uniform diameter is situated in dielectric fluid 709 between retaining members 704a and 704b. The gyricon rotational elements are electrically dipolar in the presence of dielectric fluid 709 and so are subject to rotation upon application of an electric field. Upper surface 705 is preferably transparent. This alternate embodiment of the display sheet contemplates use of all of the addressing methods described hereinabove.

The above embodiments of this invention utilize an electric field and a thermal field to move the gyricons within their respective cavities. However, it should be noted that any external field, which can cause the rotation of gyricons within their cavities, can replace the electric field of this invention. For example, if the gyricons are fabricated with magnetizable pigments, as described in U.S. Pat. No. 6,110,538 titled "Method of making a Gyricon Display Using Magnetic Latching", cited above, the gyricons may be rotated through application of a magnetic field in combination with the thermal field.

The advantage of the display disclosed in this invention over a conventional display is that this invention provides bistability. Images formed through conventional electric field structures applied to elements rotating in a hydrocarbon solvent such as Isopar® without a gelating agent will begin to deteriorate when the electric field is removed. However, images formed through the combination of an electric field and a thermal field acting on elements rotating in a hydrocarbon solvent to which a gelating agent has been added will not deteriorate with the removal of the applied fields. As the temperature of the gelating agent drops with the removal of the fields, the device cools to a temperature below the gel point of the gelating agent, thereby fixing the image until a thermal field is once again applied.

EXAMPLE 1

An electric paper device was fabricated having two indium tin oxide coated substrates sandwiching a siloxane elastomer containing gyricon rotational elements, swelled with a hydrocarbon solvent such as Isopar with about 0.5 weight percent of gelating agent, Trans-4-t-butyl-1-phenyl-cyclohexanol. The electric paper device was heated to a temperature of about 15° C. above the gel point of the Isopar/TBPC mixture, and an electric field was applied and an image formed. Heat was then removed from the device, allowing it to cool below the gel point, at which time the electric field was removed. Once cooled to below 40° C. or to room temperature, the solvent phase gels to result in a fixed image. At 0.5 weight percent gelating agent, it is necessary to cool the image to below room temperature to freeze the image, as shown in Table 1.

EXAMPLE 2

An electric paper device was fabricated having two indium tin oxide coated substrates sandwiching a siloxane elastomer containing gyricon rotational elements, swelled with a hydrocarbon solvent such as Isopar with about 0.5 weight percent of gelating agent, Trans-4-t-butyl-1-phenyl-cyclohexanol. The electric paper device was heated to a temperature of about 15° C. above the gel point of the Isopar/TBPC mixture, and an electric field was applied and an image formed. Heat was then removed from the device, allowing it to cool below the gel point, at which time the electric field was removed. Once cooled to below 40° C. or to room temperature, the solvent phase gels to result in a fixed image. At 1.0 weight percent gelating agent, the image gels within 2 minutes on cooling to room temperature, as shown in Table 1.

EXAMPLE 3

An electric paper device was fabricated having two indium tin oxide coated substrates sandwiching a siloxane elastomer containing gyricon rotational elements, swelled with a hydrocarbon solvent such as Isopar with about 0.5 weight percent of gelating agent, Trans-4-t-butyl-1-phenyl-cyclohexanol. The electric paper device was heated to a temperature of about 15° C. above the gel point of the Isopar/TBPC mixture, and an electric field was applied and an image formed. Heat was then removed from the device, allowing it to cool below the gel point, at which time the electric field was removed. Once cooled to below 40° C. or to room temperature, the solvent phase gels to result in a fixed image. At 2.0 weight percent gelating agent, the image gels within 30 seconds on cooling to room temperature, as shown in Table 1.

TABLE 1

| Example   | Agent | Imaging Temp. | Gelation Temp. |
|-----------|-------|---------------|----------------|
| Example 1 | 0.5%  | 30° C.        | 14° C.         |
| Example 2 | 1.0%  | 50° C.        | 39° C.         |
| Example 3 | 2.0%  | 70° C.        | 43.5° C.       |

The above devices are presented by means of example only. It will be appreciated that the percentage of gelating agent to Isopar could beneficially range to as much as 3% to 4%.

While the present invention has been illustrated and described with reference to specific embodiments, further modification and improvements will occur to those skilled in the art. For example, numerous changes in details of construction and the combination and arrangement of elements and materials may be resorted to without departing from the true spirit and scope of the invention. It is to be understood, therefore, that this invention is not limited to the particular forms illustrated and that it is intended in the appended claims to embrace all alternatives, modifications, and variations which do not depart from the spirit and scope of this invention.

What is claimed is:

1. A display material comprising:
   two opposing outer surfaces, wherein at least one of the outer surfaces is optically transmissive; and
   a plurality of optically and electrically anisotropic elements disposed in a substance capable of being liquified, wherein said substance comprises a dielectric fluid and a gelating agent, and wherein a rotatable disposition of each element being achievable while said element is thus disposed in said substance, said element, when in said rotatable disposition, not being attached to said substance but being suspended in said substance capable of being liquefied.

2. The display material according to claim 1, wherein said substance comprises about 0.5 to about 4 weight percent of said gelating agent.

3. The display material according to claim 2, wherein said gelating agent comprises Trans-4-t-butyl-1-phenyl-cyclohexanol.

4. The display material according to claim 1, wherein said dielectric fluid comprises Isopar®.

5. The display material according to claim 1, further comprising addressing means for selecting an element from among said plurality of elements.

6. The display material according to claim 5, wherein said addressing means comprises:
   an electrode layer; and
   a heater layer.

7. The display material according to claim 6, wherein said electrode layer comprises a plurality of electrode strips patterned in rows and wherein said heater layer comprises a plurality of heater strips patterned in columns.

8. The display material according to claim 7, wherein said electrode strips are oriented in orthogonal relationship to said heater strips.

9. The display material according to claim 5, wherein said addressing means comprises:
   a magnetized layer; and
   a heater layer.

10. The display material according to claim 9, wherein said magnetized layer comprises a plurality of magnetized strips patterned in rows, and wherein said heater layer comprises a plurality of heater strips patterned in columns and oriented in orthogonal relationship to the magnetized strips patterned in rows.

11. The display material according to claim 6, further comprising a ground plane.

12. The display material according to claim 5, further comprising a heat sink.

13. The display material according to claim 1, wherein said plurality of optically and electrically anisotropic elements are disposed as a monolayer of rotatable elements within said substance.

14. The display material according to claim 1, wherein said plurality of optically and electrically anisotropic elements are disposed in a plurality of layers of rotatable elements within said substance.

15. The display material according to claim 5, wherein said addressing means comprises:
   a point stylus device; and
   a heater layer.

16. The material according to claim 15, wherein said heater layer comprises a continuous layer.

17. The display material according to claim 5, wherein said addressing means comprises:
   an arrayed device; and
   a heater layer.

18. The display material according to claim 17, wherein said heater layer comprises a continuous layer.

19. The display material according to claim 5, wherein said addressing means comprises:
   a contact charging device; and
   a heater layer.

20. The display material according to claim 19, wherein said heater layer comprises heater strips.

21. The display material according to claim 20, wherein said heater strips are disposed in the same direction as said contact charging device.

22. The display material according to claim 1, wherein said substance is disposed within an elastomeric material.

* * * * *